Nov. 10, 1931.  H. RENAUD  1,831,753
MEASURING PUMP
Filed May 21, 1929   4 Sheets-Sheet 1

Inventor
H. Renaud,
By Marks & Clerk
Attys

Nov. 10, 1931.  H. RENAUD  1,831,753
MEASURING PUMP
Filed May 21, 1929  4 Sheets-Sheet 2
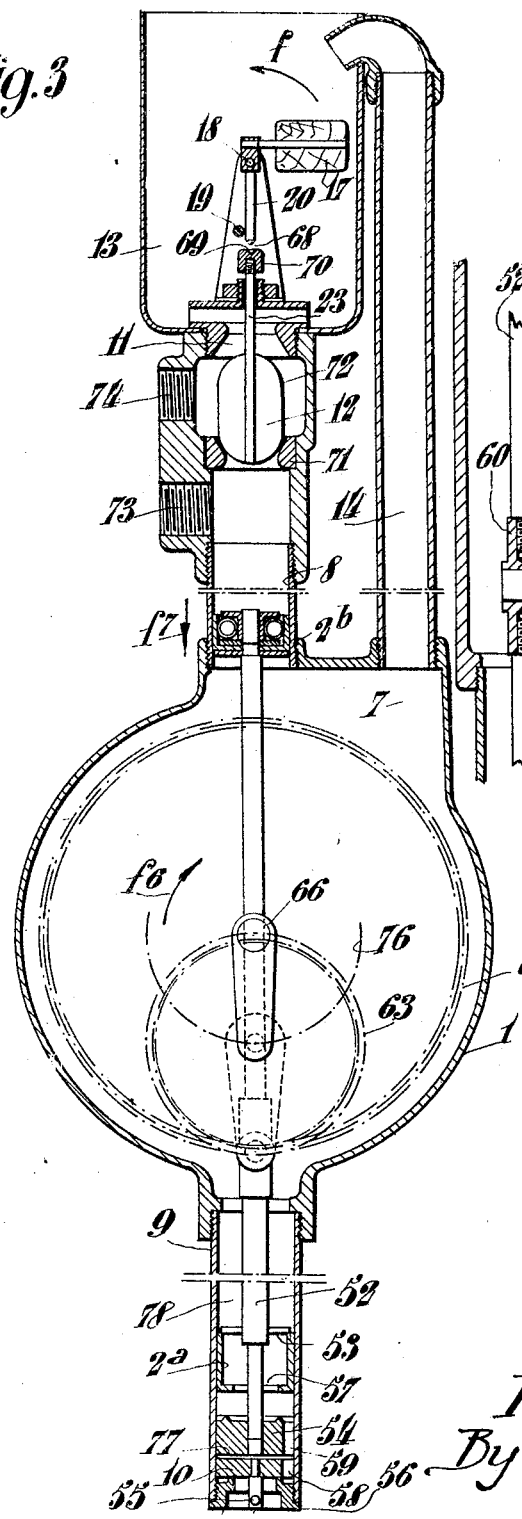
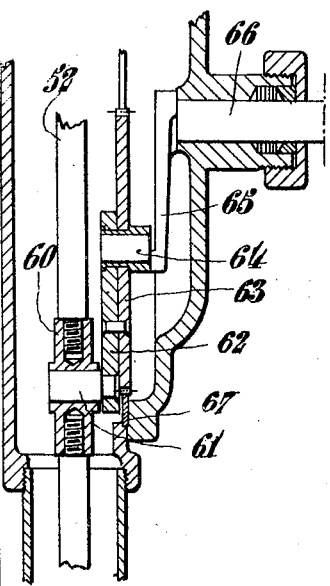
Inventor
H. Renaud
By Marks Clerk
Attys.

Nov. 10, 1931. H. RENAUD 1,831,753
MEASURING PUMP
Filed May 21, 1929 4 Sheets-Sheet 3
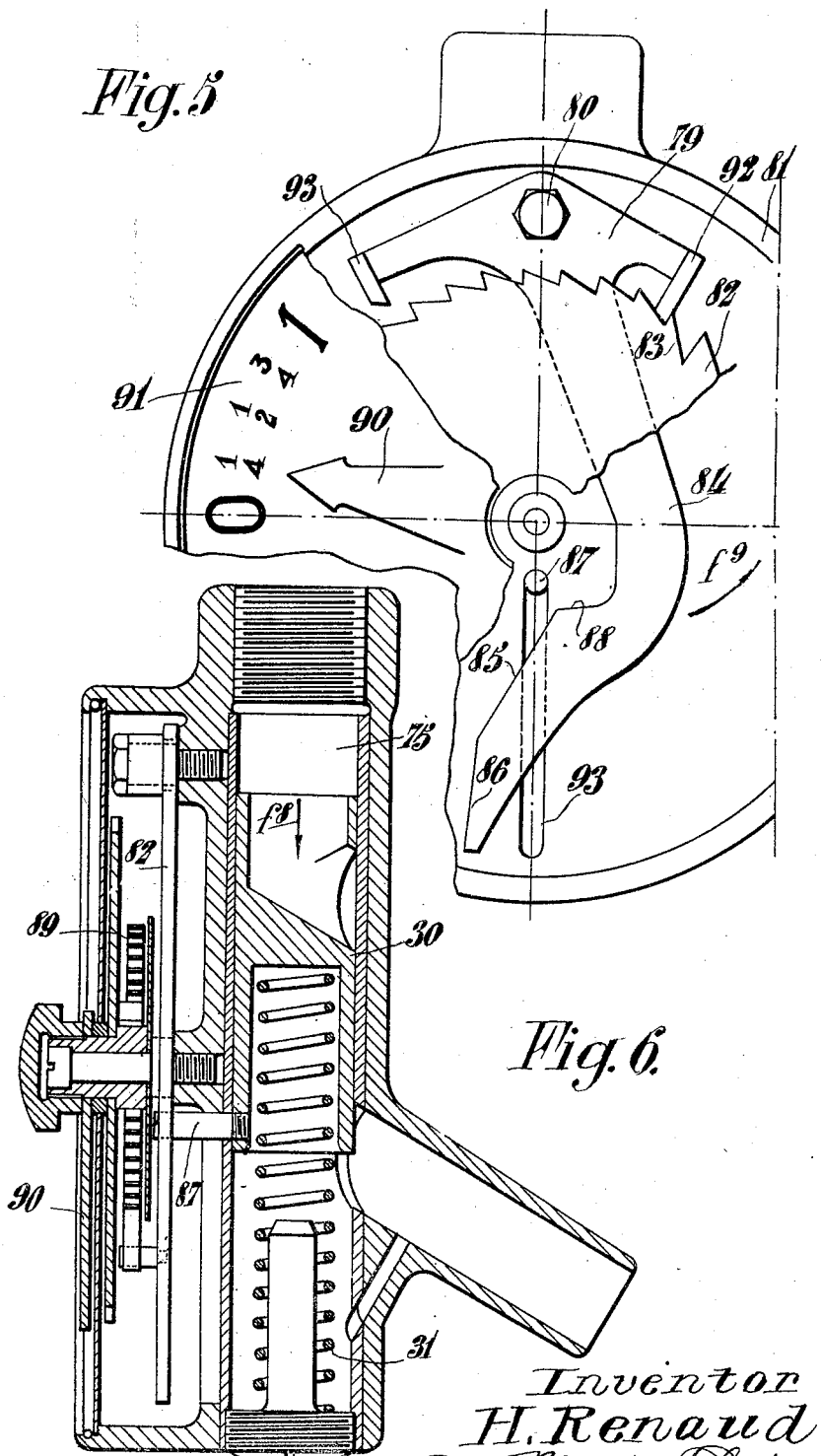
Inventor
H. Renaud
By Marker Clerk
Attys.

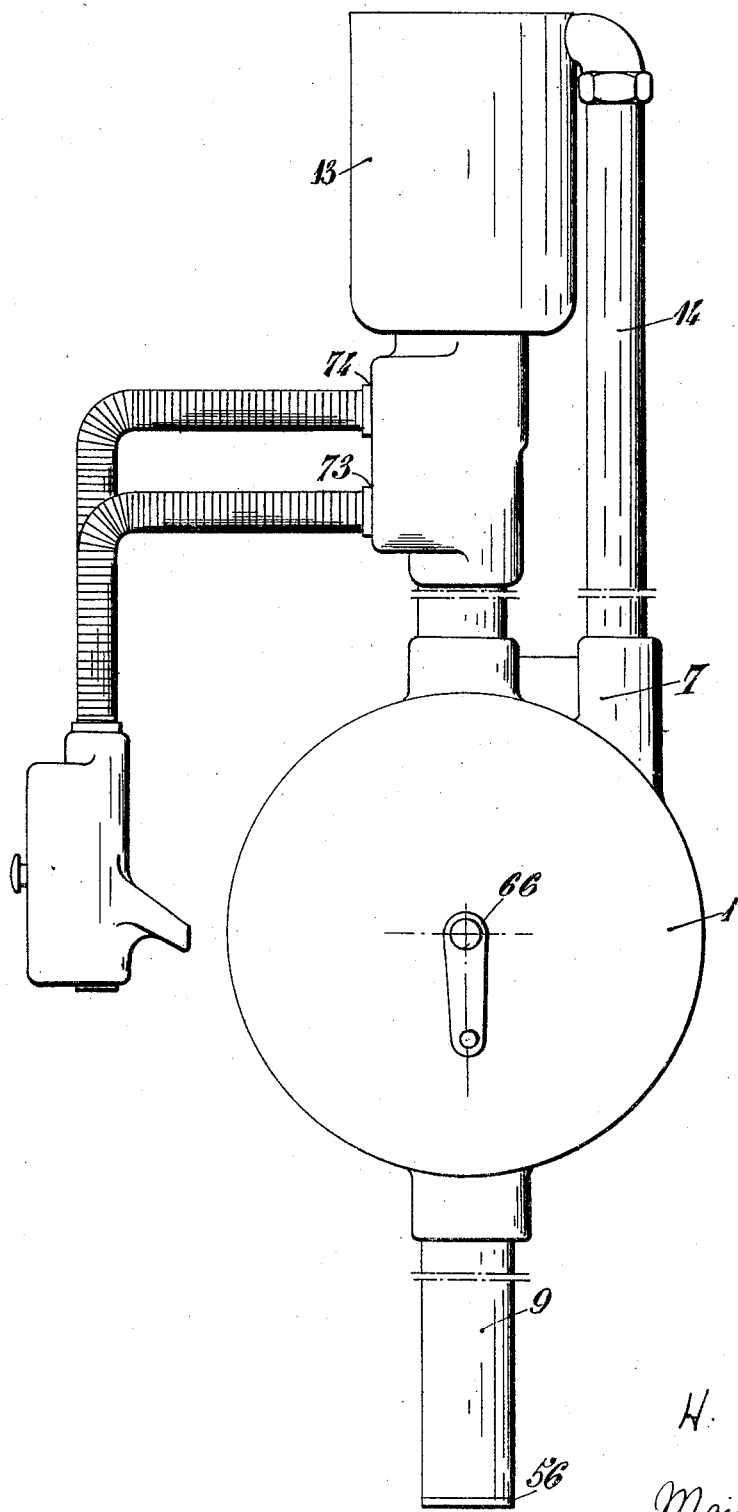

Patented Nov. 10, 1931

1,831,753

UNITED STATES PATENT OFFICE

HENRI RENAUD, OF ENGHIEN, FRANCE, ASSIGNOR TO SOCIÉTÉ ANONYME DES ETABLISSEMENTS TÉCALÉMIT, OF PARIS, FRANCE, A JOINT-STOCK COMPANY OF FRANCE

MEASURING PUMP

Application filed May 21, 1929, Serial No. 364,851, and in Belgium May 26, 1928.

The present invention relates to improvements in measuring piston or volumetric pumps, in which the liquid to be distributed is delivered by the piston in the distributing pipe line; consequently this invention does not concern measuring pumps arranged in such a way that the pressure in the distributing pipe line is due solely to gravity.

The improvements forming the subject-matter of the invention have for object: first, to ensure a very exact measurement of the distributed quantities of liquid, and, in any case, much more exact than the measurements obtained with the apparatus of this kind already existing; second, to allow the utilization of such apparatus for the distribution of very viscous liquids, such, for instance, as lubricating oils; and, third, to eliminate the air which may be contained in the liquid, before effecting the distribution of the same.

Figure 1:
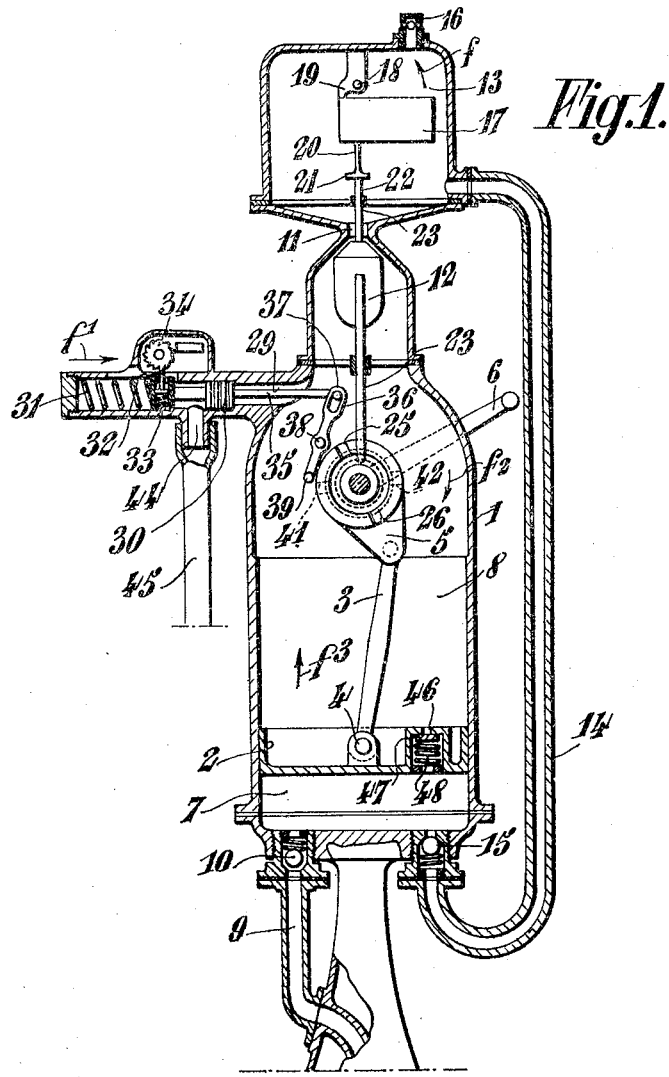
Figure 2:
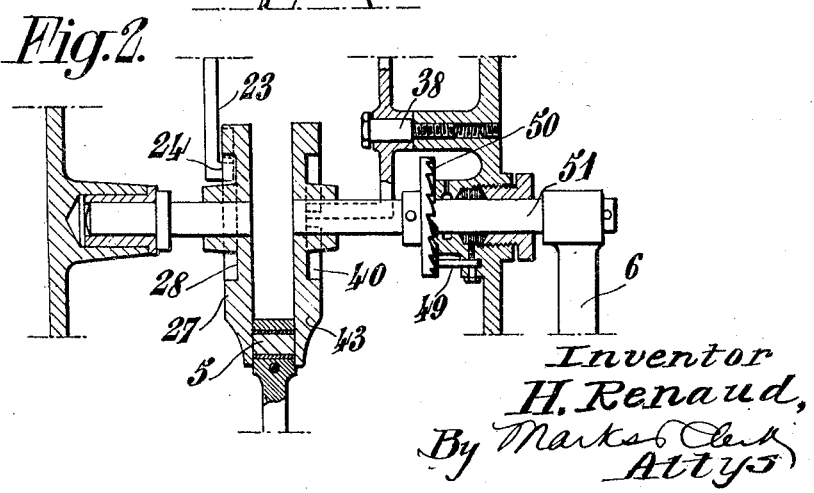

I attain these objects by the mechanism illustrated in the accompanying drawings, in which Figure 1 is a sectional elevation of the pump in its entirety, in a first form of construction; Figure 2 is also a sectional view thereof, but on one side; Figure 3 is a sectional elevation, of a modification, of which Figures 4, 5 and 6 are detail views and Figure 7 is an elevation of the modified form.

Similar numerals refer to similar parts throughout the several views.

The pump illustrated comprises a body 1, within which moves a piston 2. It is preferred to use a cylindrical body 1 and a piston 2 having a reciprocating movement, but the present invention can also be carried out with any other form of cylinder and piston, and with any other movement of piston already known in volumetric pumps actually in use.

In the preferred form of construction, the piston 2 is connected by a link 3, pivoted at 4 on the piston 2, to a crank shaft 5. This crank shaft is actuated by a driving means which may be chosen at will, and which, in the example illustrated, is constituted by a crank 6.

As in all volumetric pumps, the piston 2 divides the body 1 in two chambers, one a suction chamber 7, the other a delivery chamber 8. The suction chamber 6 is in communication with a suction pipe line 9, which is closed by a valve 10 allowing in the usual way, the supply of the liquid from the pipe line 9 towards the chamber 7, but preventing the return of the liquid from the chamber 7 towards the suction pipe line 9.

The delivery chamber 8 terminates, at its upper part, in an orifice 11 which can be closed by an obturating float device 12. This obturating system allows as will be explained later on, the admission of the liquid into the chamber 8, but, in certain cases, prevents the liquid issuing from the chamber 8 through the orifice 11.

The orifice 11 leads in a chamber 13 surmounting the delivery chamber 8, and hereinafter called "compensating chamber". This compensating chamber 13 is connected to the suction chamber 7 by a pipe line 14 provided with a delivery obturator 15. This obturator allows the flow of the liquid from the suction chamber 7 towards the compensating chamber 13, but prevents the return of the liquid from the compensating chamber 13 towards the suction chamber 7. The chamber 13 is in communication with the atmosphere through a vent 16, and is provided with a float 17 pivoted at 18 and arranged in such a way that the hydrostatic stress exerted on this float by the liquid contained in the chamber 13, tends to rotate the float 17 in the direction of the arrow $f$. The weight of the float tends, on the contrary, to bring it in the position illustrated, in which it abuts against the fixed bearing portion 19. The rod 20 of the float 17 is provided with an abutment 21 against which bears the end 22 of a rod 23 rigid with the float 12.

The rod 23 of the float 12 extends within the chamber 8 and terminates, at its lower part, in a bent portion 24. This bent portion 24 can, under certain circumstances, as will be explained later on, pass through radial grooves 25 or 26 provided in a flange 27 on the crank shaft 5. In this way, the bent portion 24 can either extend in the circular groove 28 delimited by the flange 27, or it can be located outside this flange.

In the chamber 8, and at the upper part of the same, opens a distributing pipe line 29.

This pipe line 29 is normally closed by an obturator which is subjected to the action of a spring 31. This obturator 30 carries a pawl 32 subjected to the action of a spring 33, and which can come in engagement with a toothed wheel 34 actuating a totalizing meter. This toothed wheel is actuated when the obturator 30 comes back to the position illustrated in the drawings, in the direction of the arrow $f^1$, under the action of the spring 31. The obturator 30 extends in a rod 35 fitting in an eye 36 of a lever 37 pivoted at 38, and the other end 39 of which can, either fit into the circular groove 40 of the crank shaft 5, by passing through the radial grooves 41 and 42, or can be located outside the flange 43 of the crank shaft 5.

The distributing pipe line 29 is provided with a union 44 to which is fitted a flexible pipe or hose 45, so as to facilitate the filling of the tanks by means of the pump.

Finally, the piston 2 is provided with an opening 46, closed by an obturator 47, subjected to the action of a spring 48, the strength of this spring being greater than that of the spring 31. The obturator 47 will open for allowing the liquid to pass from the delivery chamber 8 towards the suction chamber 7, when the pressure in the chamber 8 will be sufficient for overcoming the resilient stress of the spring 48.

The operation is as follows:

When the crank 6 is operated in the direction of the arrow $f^2$, the piston 2 receives a reciprocating movement within the body 1. During the suction stroke, the liquid is admitted, through the pipe line 9, into the chamber 7, and during the delivery stroke, the liquid passes from the chamber 7 to the compensating chamber 13, and from the compensating chamber 13 towards the delivery chamber 8, through the orifice 11. The latter is, in fact, open, since the float 12 is not lifted by the liquid.

When the chamber 8 is sufficiently filled with liquid, in order that the float 12 may tend to rise, it will be seen that, nevertheless, this float cannot move since it abuts at 21. It will be able to rise under the action of the hydrostatic stress and close the orifice 11 only when the float 17 will itself be subjected to the hydrostatic stress, that is to say when the chamber 13 will be filled up to a predetermined level. This arrangement has for object to allow the closing of the chamber 8, by the float 12, only when this chamber is completely filled with a liquid which is deprived of air bubbles, since these latter have been able to freely escape through the orifice 11.

But, the float 12 cannot rise at any moment, even when the float 17 has been released from the abutment 21. In fact, as long as the float 12 was held in its low position, the bent portion 24 was in the groove 28, and the flange 27 prevented it from rising. The float 12 will be able to rise only when the float 17 will itself be lifted, and when the radial grooves 25 or 26 will come opposite the finger 24. The groove 25 corresponds to a determined position of the delivery stroke of the piston 2, that is to say of the stroke which takes place according to the arrow $f^3$, whilst the groove 26 corresponds to the end of the up stroke of the piston 2.

If, at the end of the up stroke of the piston 2, the float 12 rises, the bent portion 24 passing in the groove 26, it will be noted that, as soon as the piston 2 begins to move down again, the float 12 moves downwardly under the action of the suction created in the chamber 8; the bent portion 24 passes again in the grooves 26 and re-engages under the flange 27. Consequently, in practice, the definitive rising of the float 12 can take place only through the groove 25.

Let us assume that the float 12 has just risen and closed the orifice 11. This movement corresponds to a precise position of the piston 2, that is to say to a rigorously defined capacity of the chamber 8. All the orifices being closed, the liquid contained in this chamber will tend to push back the piston 30 in antagonism to the action of the spring 31. This movement is only permitted provided the end 39 of the lever 36 can engage in the corresponding groove 41, which will be the case if the float 12 has really operated as described, that is to say if there has been no perturbations in the operation. If such is the case, the piston 30 moves in reverse direction to the arrow $f^1$ and uncovers the opening 44, so that the liquid can flow under pressure through the pipe line 45.

When the piston 2 has arrived at the end of its up stroke, a rigorously determined quantity of liquid has been sent in the pipe line 45. As soon as the piston 2 begins to move down again, the float 12 also moves down, by engaging the groove 26; moreover, the piston 30 re-takes its initial position by releasing from the flange 43 through the groove 42. The cycle described can then begin over again.

If it is assumed that, during the operation, the float 12 should unduly close the orifice 11, it will be seen that the space 8 is absolutely closed, since the piston 30 can move only for a determined position of the piston 2. In this case, the liquid escapes through the orifice 46, by pushing back the obturator 47.

As already indicated, the meter 34 operates when the piston 30 comes back to its initial position, in the direction of the arrow $f^1$. For preventing the possibility of causing the meter to unduly operate, a pawl 49 will be advantageously provided, this pawl engaging with a ratchet 50 secured on the arbor 51 of the crank shaft 5, in order to prevent the latter from being caused to rotate in reverse direction to the arrow $f^2$.

If desired, the float device 17 of the compensating chamber 13 can be dispensed with. The present system would operate in a nearly identical manner, but of course, there would not be the same certainty that the chamber 8 is totally filled.

Likewise, both safety devices constituted: one by the part 24 of the float stem or rod 23, and the other by the system of lever 37, may not exist both simultaneously. Only one of these two devices can be used, but of course, with less security.

In the example shown in Fig. 3, the safety device, constituted by the lever 37 has been done away with, in order that it would be possible to place the obturator 30, as well as the meter device, at the end of the flexible pipe line 45. This form of construction, is more particularly utilizable in case the distributed liquid is of great viscosity, such for instance as a lubricating oil. In this case, in fact, it cannot be admitted that the obturator 30 should be followed bp a piping of large dimension, because it would be necessary, once the obturator 30 has come back to its initial position, to let the liquid contained in the pipe line flow away by gravity. This flowing away, in order to be complete, would necessitate a period of time so much the more considerable as this pipe line is longer. It will be understood that this period of time is reduced to the minimum when the obturator 30 is arranged quite at the end of the pipe line 45.

In this figure also, the safety device, constituted by the part 24 of the float stem 23, has been replaced by another safety system, which plays the same function, but which is of a more simple construction. Either of these safety devices can be used.

In this example of Fig. 3, a pump of the type described has been shown, but in which provisions have been made in order that the measurement may be effected, and exactly effected even if leakage exists in the suction pipe line.

In this example, the entire suction pipe line 9 is arranged within the liquid tank, which is not shown. Within this suction pipe line 9 can move a piston $2^a$. The piston $2^a$ is loose on the rod 52 to which is imparted an axial reciprocating movement of translation, as will be seen later on, but the said piston $2^a$ abuts, on one side, against a pin 53 and, on the other side, against a plate 54 secured on the end of the rod 52. The suction valve 10 is arranged at the lower end of the suction pipe line 9; an abutment 55 constituted by a pin, prevents the valve 10 from rising too high under the action of the suction, this pin 55 abutting against the plug 56. The piston $2^a$ is provided with a large axial hole 57, the valve 10 has side orifices such as 58, and the plate 54 is also provided with side orifices such as 59.

The rod 52 diametrally extends through the body 1 and terminates, at its upper part, in a delivery piston $2^b$. The rod 52, as is clearly shown in Fig. 4 carries a bearing 60 in which is mounted a trunnion 61, which is secured on an arm 62 integral with a toothed wheel 63 pivoted at 64 on a crank 65, the axis 66 of which is actuated by any driving means. The toothed wheel 63 gears with a fixed crown 67 the center of which is on a geometrical extension with the axis 66 and the pitch diameter of which is exactly double the diameter of the wheel 63.

In accordance with the kinematic theorem, known under the name of Lahire's theorem, it will be seen that the axis 61, when the crank 65 is rotated, describes a straight line which is a diameter of the crown 67. Consequently, the rod 52 receives an axial movement of translation. The suction chamber 7, constituted by the body 1, is in communication, as illustrated, with the suction pipe line 9. The conduit 14 opens also in this chamber 7, but at the upper part, and it leads to the compensating chamber 13, as in the preceding cases. In this compensating chamber is arranged, as previously, the float 17 pivoted at 18 and the abutment 19 for the said float, as well as the stop rod 20. But, in this example, this rod 20 terminates in a conical part 68, co-operating with a conical hole 69 provided in a member 70 secured at the end of the rod 23 of the float 12. This float, when it is not subjected to the hydrostatic stress, rests on a seat 71 separating the delivery chamber 8 from the upper capacity 72, connected by the seat 11 to the compensating chamber 13. The capacities 8 and 72 are connected, by the orifices 73 and 74 and by two independent pipe lines, to a common capacity 75 placed in the frame of the meter device which is arranged at the delivery end of the liquid distributed. This meter device will be described later on, more in detail, but it comprises an obturating piston distributing system 30, as in the preceding example.

The operation is as follows:

It will be assumed that the whole structure is in the position illustrated in Fig. 3, a torque being exerted on the crank 65 in the direction of the arrow $f^6$. The axis 64 describes the cylinder illustrated at 76; the wheel 63 rolls on the crown 67, and the axis 61 describes a hypocycloid which, in this particular case, is a diameter. The piston $2^a$ and the piston $2^b$ are therefore driven upwardly. This stroke allows to effect the suction of the liquid in the lower portion of the pipe line 9, the valve 10 opening for that purpose. The orifice 57 of the piston $2^a$ is closed by the plate 54.

During the down stroke, the piston $2^a$ lifts from the plate 54. The valve 10 closes. The liquid contained in the space 77 passes, through the orifice 59 and through the orifice 57, into the space 78.

During the up stroke which will follow, the liquid contained in the space 78 is delivered into the chamber 7, whilst a new suction takes place. The cycle is thus repeated until the liquid arrives, through the pipe line 14, in the compensating chamber 13, then, through the orifice 11, pipe line 74, capacity 75, orifice 73, filling the delivery chamber 8. When the float 12 is subjected to the hydrostatic stress, it tends to rise. But, it abuts at 69 against the conical part 68, this preventing the float 12 from closing the orifice 11. When the float 17 is also subjected to the hydrostatic stress, it tends to rotate in the direction of the arrow $f$. But this movement cannot take place if the part 69 is in engagement with the part 68, that is to say if the float 12 is subjected to the hydrostatic stress.

At a certain moment, the float 12 and the float 17 being both subjected to the hydrostatic stress, the piston $2^b$ moves in the direction of the arrow $f^7$. At this moment, the liquid contained in the chamber 13 being sucked towards the chamber 8, the flow of the liquid forces the float 12 to move down; notwithstanding the hydrostatic stress. The cone 69 releases from 68, and the float 17 can rotate. As soon as the piston $2^b$ will tend to rise again in reverse direction to the arrow $f^7$, the float 12 will also be able to rise again and to fit against the seat 11 which will thus be closed. The seat 11 can therefore be closed only if the compensating chamber 13 is filled up to a predetermined level, before a down stroke of the piston $2^b$. When these two conditions are fulfilled, the seat 11 will be closed during the up stroke of the piston $2^b$ and the delivery of the liquid will take place in the distributing pipe line.

The arrangement which has just been described allows to have the certainty that the delivery will take place only after total filling up, and without empty spaces, of the chamber 8, pipe lines 73 and 74, capacity 75 and capacity 72. It will be seen that a small cause of error might occur owing to the displacement imposed to the piston 30 in antagonism with the spring 31. But this small cause of error is eliminated by the devices adopted for driving the piston $2^a$, in both directions, only with a certain lag, exactly corresponding for the volume generated, to the volume generated by the piston 30. In this way, a suction rigorously equal to the delivery is obtained.

The system of meter, illustrated in Figs. 5 and 6, is constructed in the following manner:

A kind of anchor for escapement, shown at 79, is pivoted at 80 on the body of the casing 81. The anchor 79 can come in engagement with a toothed wheel 82 of particular type, one of the teeth 83 of which is deeper than the others. The anchor 79 is provided with an extension 84 having, at its end, two inclines 85 and 86, with which can come in engagement a claw 87 integral with a piston 30. A shoulder 88 proceeds the incline 85.

The ratchet wheel 83 is subjected to the action of a spiral spring 89 and, moreover, it drives an index 90 moving opposite a dial 91. The spring 89 constantly tends to bring back the index 90 opposite the zero of the graduation 91.

In this position, that is to say when the index 90 is opposite the zero of the graduation 91, the part 92 of the anchor 79 is engaged in the tooth 83 and the claw 87 presses against the abutment 88 of the lever 84. It will be seen that any hydraulic pressure, exerted in the chamber 75, and tending to push the piston 30 in the direction of the arrow $f^8$, is counteracted by the locking action exerted by the abutment 88, which prevents the finger 87 from moving in the groove 93. Any distribution of liquid is therefore impossible before the operator, acting with his hand on the index 90, has brought this index opposite the digit corresponding to the quantity of liquid to be distributed.

Let us assume that it is desired to distribute one litre of liquid; the operator brings the index 90 opposite the digit 1 of the graduation 91, by stretching the spring 89. The incline 85 comes opposite the claw 87, so that the movement of the piston 30 will be possible. This movement will have for effect to rotate the anchor 79 in the direction of the arrow $f^9$. The part 92 will move to the extent of one tooth, but the rotation of the wheel 82 will be prevented by the part 93, which will come in engagement in a tooth of the wheel 82. During the return stroke of the piston 30, under the action of the spring 31, the part 93 will escape, but, before the part 92 has come back in another tooth, the spring 89 will have caused the wheel 82 to rotate so as to bring back the index 90 towards the zero of the graduation. The rotation takes place for one tooth only, the engagement of the part 92 preventing a subsequent rotation. It will thus be seen that upon each displacement of the piston 30, corresponding to a complete stroke of the piston $2^b$, that is to say to a distribution of a definite quantity of liquid, the index 90 will come back, according to a definite extent, towards the zero. When the index 90 has come back opposite the zero, the part 92 enters the deep tooth 83, the abutment 88 again prevents the displacement of the finger 87, this rendering impossible any new distribution of liquid before having manipulated again the index 90.

It will be noted that the device in accordance with the invention allows the filling of a tank arranged at a level higher than that of the pump, which could be impossible with the known devices in which the flowing away of the measured liquid takes place by simple gravity. These known devices are not, moreover, applicable to the distribution of viscuous liquids, such as lubricating oils, and among the devices which operate with a delivery pressure, none, to my knowledge has allowed to obtain up to now a sufficiently exact measurement (particularly for viscuous liquids) in order to be authorized by the authorities who have the control of measuring apparatus.

What I claim as my invention, and desire to secure by Letters Patent, is:—

1. In combination: a pump arranged to suck the liquid contained in a lower tank, and to force this liquid into another tank located at an upper level; a piston operated volumetric force pump situated at an intermediate level, and arranged in such a manner that the suction port be placed at the upper part of the pump body; an obturating device provided with a float, for controlling the said suction port; means for connecting the said suction port to the upper tank; a delivery conduit for the piston operated pump situated at an intermediate level; a unidirectional spring obturating system for the said delivery conduit; and means for locking the obturating device provided with a float in its open position until the liquid reaches a predetermined level in the upper tank, at the end of the suction stroke of the piston of the pump located at an intermediate level.

2. In combination: a force piston operated pump arranged to force the liquid contained in a lower tank into another tank situated at an upper level; a second force piston operated pump, located at an intermediate level, the suction port of the said pump being placed at the upper part of the body; an obturator provided with a float for controlling the said suction port; means to connect the said suction port to the upper tank; a delivery conduit for the piston operated pump placed at an intermediate level; a unidirectional spring obturating system for the said delivery conduit; a locking float operated system ararnged in the upper tank for maintaining the float operated obturator in its open position until the liquid reaches a predetermined level in the upper tank at the end of the suction stroke of the piston of the second force pump.

3. In a measuring pump, a cylinder, a piston movable in the cylinder and forming therein a delivery chamber of variable volume, means for actuating the piston, a distributing conduit communicating with the delivery chamber, a valve arranged in the said conduit and adapted to open under a certain pressure, means for filling the delivery chamber with liquid, and means for preventing the opening of the valve unless the delivery chamber is completely full when it is at its maximum volume.

4. In a measuring pump, a cylinder, a piston movable in the cylinder and forming therein a delivery chamber of variable volume, means for actuating the piston, a distributing conduit communicating with the delivery chamber, a valve arranged in the conduit and adapted to open under a certain pressure, means for filling the delivery chamber with liquid, a tank arranged above the delivery chamber and communicating with the said chamber through an orifice, means for closing this orifice when the delivery chamber is completely full at the moment when it attains its maxium volume.

5. In a measuring pump, a cylinder, a piston movable in the cylinder and forming therein a delivery chamber of variable volume, means for actuating the piston, a distributing conduit communicating with the delivery chamber, a valve arranged in this conduit and adapted to open under a certain pressure, a tank arranged above the delivery chamber and communicating with the said chamber through an orifice, an obturator provided for closing this orifice during the delivery stroke of the piston, means for filling the tank with liquid, a locking system with float arranged in the upper tank for maintaining the obturator in its open position when the liquid has not attained a predetermined level in the said tank at the moment when the delivery chamber has its maximum volume.

6. In a measuring pump, a cylinder, a piston movable in this cylinder and forming therein a delivery chamber of variable volume, means for actuating the piston, a distributing conduit communicating with the delivery chamber, a valve arranged in the said conduit and adapted to open under a certain pressure, a tank arranged above the delivery chamber and communicating with the said chamber through an orifice, an obturator provided for closing this orifice and comprising a rod extending into the upper tank, means for guiding the displacement of the obturator, means for filling the tank with liquid, a lever pivoted in the tank and adapted to be combined with the rod of the obturator when this tends to close, in order to prevent the termination of this closing movement and also to prevent any rotation of the lever, a float connected to the said lever for causing it to rotate and to disengage the rod from the obturator when the liquid attains a predetermined level in the tank at the moment when the delivery chamber presents its maximum volume.

In testimony whereof I have signed this specification.

HENRI RENAUD.